(12) United States Patent
Silano et al.

(10) Patent No.: US 10,535,370 B2
(45) Date of Patent: Jan. 14, 2020

(54) SYSTEM FOR GENERATING AN OUTPUT FILE

(71) Applicant: CSER VENTURES, LLC, Satellite Beach, FL (US)

(72) Inventors: Carmine John Silano, Saint James, NY (US); Edward Newsome Roberts, Satellite Beach, FL (US)

(73) Assignee: CSER VENTURES, LLC, Melbourne, FL (US)

( * ) Notice: Subject to any disclaimer, the term of this patent is extended or adjusted under 35 U.S.C. 154(b) by 247 days.

(21) Appl. No.: 15/520,972

(22) PCT Filed: Oct. 20, 2015

(86) PCT No.: PCT/US2015/056398
§ 371 (c)(1),
(2) Date: Apr. 21, 2017

(87) PCT Pub. No.: WO2016/064830
PCT Pub. Date: Apr. 28, 2016

(65) Prior Publication Data
US 2018/0024705 A1    Jan. 25, 2018

Related U.S. Application Data

(60) Provisional application No. 62/066,932, filed on Oct. 22, 2014.

(51) Int. Cl.
*G11B 27/031* (2006.01)
*G06F 3/0484* (2013.01)
(Continued)

(52) U.S. Cl.
CPC .......... *G11B 27/031* (2013.01); *G06F 3/0482* (2013.01); *G06F 3/0484* (2013.01);
(Continued)

(58) Field of Classification Search
CPC .. G06F 3/04842; G06F 3/0482; G06F 3/0486; G06F 3/04817; G06F 16/70;
(Continued)

(56) References Cited

U.S. PATENT DOCUMENTS

2001/0041050 A1* 11/2001 Iwata .................. G06Q 50/184
  386/252
2006/0008247 A1*  1/2006 Minami ............... G11B 27/034
  386/280

(Continued)

*Primary Examiner* — Nicholas Ulrich
(74) *Attorney, Agent, or Firm* — Onello & Mello, LLP

(57) ABSTRACT

A system for creating an output comprises a processing unit, a user input module operably connected to the processing unit, and a video monitor operably connected to the processing unit. The processing unit provides on the video monitor: a grid image comprising multiple cells, each cell representing a duration of time; and a selection area comprising multiple select icons, each select icon representing a source data file. The processing unit is configured such that a user can create a grid layout representing the correlation between individual selected source data files and one or more of the multiple cells. The processing unit produces the output based on the correlation.

28 Claims, 6 Drawing Sheets

(51) Int. Cl.
   *G06F 3/0486* (2013.01)
   *G06F 3/0481* (2013.01)
   *G06F 3/0482* (2013.01)
   *G11B 27/34* (2006.01)
   *G06F 3/16* (2006.01)

(52) U.S. Cl.
   CPC ........ *G06F 3/0486* (2013.01); *G06F 3/04817* (2013.01); *G11B 27/34* (2013.01); *G06F 3/165* (2013.01); *G10H 2220/101* (2013.01); *G10H 2220/106* (2013.01)

(58) Field of Classification Search
   CPC ...... G06F 16/40; G06F 16/739; G06F 16/743; H04N 21/854; G06Q 30/00; G11B 27/031; G10H 2220/106; G10H 2220/101
   See application file for complete search history.

(56) References Cited

U.S. PATENT DOCUMENTS

| | | | | |
|---|---|---|---|---|
| 2011/0209224 A1* | 8/2011 | Gentile | ............ | G06F 21/10 |
| | | | | 726/27 |
| 2012/0221383 A1* | 8/2012 | Shore | ............ | G11B 27/034 |
| | | | | 705/14.1 |
| 2013/0120442 A1* | 5/2013 | Dhawan | ............ | G06T 3/0012 |
| | | | | 345/629 |
| 2014/0115477 A1* | 4/2014 | Pendergast | ......... | G06F 3/04842 |
| | | | | 715/723 |

* cited by examiner

SYSTEM FOR GENERATING AN OUTPUT FILE

RELATED APPLICATION

This application claims the benefit of U.S. Provisional Patent Application Ser. No. 62/066,932, filed Oct. 22, 2014, the content of which is incorporated herein by reference, in its entirety.

FIELD

The present inventive concepts generally relate to the field of systems for creating an output, such as a system that operates over a network to produce an output that correlates source data files to cells of a grid layout.

BACKGROUND

Computerized and manual systems for creating an output representing data files are available. Systems for linking audio files to a choreographed routine involve manual generation of the links on paper forms. There is a need for improved systems, methods and devices for creating an output representing multiple linked data files.

SUMMARY

According to one aspect of the present inventive concepts, a system for creating an output comprises a processing unit, a user input module operably connected to the processing unit, and a video monitor operably connected to the processing unit. The processing unit provides on the video monitor: a grid image comprising multiple cells, each cell representing a duration of time; and a selection area comprising multiple select icons, each select icon representing a source data file. The processing unit can be configured such that a user can create a grid layout representing the correlation between individual selected source data files and one or more of the multiple cells; and the processing unit can produce the output based on the correlation.

In some embodiments, the grid image comprises multiple rows, each comprising at least one cell. The multiple rows each can comprise at least four cells, or at least eight cells. The processing unit can be further configured such that a user can add and/or remove one or more rows to and/or from the grid image.

In some embodiments, the processing unit is further configured to set the total number of rows based on input from a user. The processing unit can be further configured such that a user can add and/or remove cells to and/or from one or more rows.

In some embodiments, the processing unit is further configured to set the total number of cells per row based on input from a user. Each row can comprise the same number of cells.

In some embodiments, each cell is associated with a beat of music.

In some embodiments, the time duration of each cell is adjustable based on input from a user. Each cell can be associated with a beat of music and the user input can adjust the numbers of beats per unit time (e.g. adjust the number of beats per minute).

In some embodiments, the time duration of each cell comprises a time between 0.25 seconds and 1.0 seconds.

In some embodiments, at least one select icon comprises an image representing an audio file. The system can further comprise audio file information related to the audio file, and the audio file information can comprise information selected from the group consisting of: text description of audio file; duration of audio file; performer of audio file; composer of audio file; artist associated with audio file; cost of audio file; offset associated with audio file; and combinations thereof. The processing unit can be configured to display the audio file information on the video monitor. The audio file information can be displayed on and/or near the at least one select icon. The audio file information can be displayed when a user hovers a cursor over the at least one select icon. The audio file information can be displayed when the at least one select icon is selected by a user. The at least one select icon can represent multiple audio files.

In some embodiments, at least one select icon comprises a text image. The processing unit can be configured such that a user can enter text correlating to the text image.

In some embodiments, at least one source data file comprises an audio file. The audio file can comprise a music file. The audio file can comprise a sound effect. The audio file can comprise a voice over. At least one source data file can further comprise audio information. The audio information can comprise amplitude information. The amplitude information can be adjustable by a user. The audio information can comprise offset information. An associated select icon can comprise a width, and the width can include or not include the offset time duration. The offset information can be adjusted by a user. The audio information can comprise trail off information. An associated select icon can comprise a width, and the width can include or not include the trail off time duration. The trail off information can be adjusted by a user.

In some embodiments, at least one source data file comprises an image file. An associated select icon can comprise a thumbnail preview of the image file.

In some embodiments, at least one source data file comprises a text file. An associated select icon can comprise user editable text.

In some embodiments, at least one source data file comprises a video file. An associated select icon can comprise a thumbnail preview of the video file. The thumbnail preview can be user selectable. The playback speed of the video file can be adjustable. The starting frame of the video file can be selectable. The ending frame of the video file can be selectable. The width of the associated select icon can be determined by the start and end frames of the video file.

In some embodiments, the source data file comprises information correlating to the appearance of the select icon representing the source data file on the video monitor.

In some embodiments, the source data file comprises cost information correlating to cost of including the source data file in the output.

In some embodiments, the source data file comprises position information correlating to where the select icon representing the source data file will appear within a cell of the grid image. The position information can comprise information related to where the associated select icon will appear in relation to select icons of other source data files in the same cell.

In some embodiments, the source data file comprises a proprietary overlay. The proprietary overlay can comprise a sound overlay. The overlay can be dynamically generated during playback. The location of the overlay can be dynamically computed. The pitch of the overlay can be modified by the processing unit. The speed of the playback of the overlay can be modified by the processing unit. The frequency of the overlay can be modified by the processing unit. The proprietary overlay can comprise an image overlay. The proprietary overlay can comprise a removable overlay. The processing unit can be configured to remove the overlay upon purchase of the output. The processing unit can be configured to remove the overlay when combined with a second source data file also including a proprietary overlay.

In some embodiments, the processing unit is configured to allow a user to associate multiple source data files to at least one cell.

In some embodiments, the processing unit is configured to associate a source data file with a cell, such as when a user drags and drops the associated select icon in the cell. The select icon can be dragged from the selection area to the cell. Multiple select icons can be dragged from the selection area to a cell simultaneously. The select icon can be dragged from a first cell to a second cell. Multiple select icons can be dragged from the first cell to the second cell simultaneously.

In some embodiments, the processing unit is further configured to allow a user to associate a select icon with a cell by direct entry of data into the cell. The system can comprise a lookup menu of select icons configured to assist in the direct entry.

In some embodiments, the system comprises a microphone, and the processing unit is configured to allow a user to associate a select icon with a cell via voice control via the microphone.

In some embodiments, the processing unit is configured to provide a copy and paste function for associating a select icon with a cell.

In some embodiments, the processing unit comprises a keyboard comprising arrow keys, and a select icon can be moved from cell to cell via the arrow keys.

In some embodiments, multiple cells comprise similar durations of time.

In some embodiments, a first cell comprises a first duration of time, and a second cell comprises a second duration of time, and the first duration of time can be similar to and/or dissimilar from the second duration of time.

In some embodiments, the processing unit comprises a local computer.

In some embodiments, the processing unit comprises a local computer only.

In some embodiments, the processing unit comprises multiple computers.

The multiple computers can be connected over a network. The network can comprise a network selected from the group consisting of: the Internet; a LAN; and combinations thereof. The multiple computers can be configured as an Internet-based user interface. At least one of the two computers can comprise a computer selected from the group consisting of: desktop; laptop; server; storage device; tablet; phone; and combinations thereof. At least one computer can be configured to support multiple users simultaneously. The multiple users can be located at multiple different locations remote from the at least one computer. The at least one computer can be configured to perform multi-threaded processing. The at least one computer can comprise multiple CPUs.

In some embodiments, the processing unit is configured to allow access by multiple users. The processing unit can comprise a login function comprising a permission routine.

In some embodiments, the processing unit is configured to allow a user to perform two or more of the following steps: populate the grid layout; edit the grid layout; process the grid layout; review the grid layout; finalize the grid layout; purchase the output; and retrieve the output.

In some embodiments, the processing unit comprises a preview function. The preview function can be configured to master a cumulative set of selected source data files. Mastering can include a process selected from the group consisting of: summing; combining; manipulating; processing; mastering; equalizing; compressing; filtering; delaying; adding reverb; adding harmonic excitement; and combinations thereof. The processing unit can be configured to allow a user to adjust the mastering process. The processing unit can be configured to use a predefined mastering process. The processing unit can comprise at least one user selectable sound processing effect used in the mastering process. The at least one user selectable sound processing effect can comprise two or more of the following: edgy, smooth, warm, bright, and distorted.

In some embodiments, the processing unit is configured to provide status information on the video monitor. The status information can be related to creation of the output and/or audio processing of selected source data files.

In some embodiments, the processing unit further comprises a file storage library configured to store multiple source data files. The file storage library can be configured to store files selected from the group consisting of: audio file; music file; sound effect file; voice over file; text file; image file; video file; and combinations thereof.

In some embodiments, the processing unit further comprises a sound modification module configured to modify a source data file comprising an audio file. The sound modification module can be configured to perform group editing of a set of multiple source data files. The set of multiple source data files can comprise multiple files each comprising a similar category of audio file. The similar category can comprise a category selected from the group consisting of: music; voice over; sound effect; and text. The sound modification module can be configured to present source data file information graphically on the video monitor. The sound modification module can be configured to graphically represent one or more of: waveform, trim, and spectrum analyzer. The source data file can comprise a user generated source data file.

In some embodiments, the processing unit further comprises a cost calculation module configured to provide cost information related to the selected source data files and/or the output. The cost calculation module can be configured to dynamically adjust cost information as the content of the grid layout changes. The cost calculation module can be configured to adjust costs based on one or more of: length associated with the output; source data files included in the output; and cost reduction associated with a user. The cost information can be presented on the video monitor at least prior to purchase of the output by a user.

In some embodiments, the processing unit further comprises a proprietary matching module configured to match one or more compatible source data files based on one or more properties of the source data files. The matching module can be configured to match multiple source data files. The property can include one or more numeric values assigned to the source data file. The one or more values can be displayed on the select icon representing the source data file.

In some embodiments, the processing unit further comprises a proprietary overlay placement module. The overlay placement module can be configured to place an audio overlay. The overlay placement module can be configured to place an image overlay. The image overlay can comprise alphanumeric data. The overlay placement module can be configured to include an overlay on pre-purchased audio files played and/or downloaded. The overlay placement module can be configured to remove an overlay upon purchase of the output.

In some embodiments, the processing unit further comprises a text to speech function. The processing unit can be configured to generate a source data file comprising synthetic and/or computer generated speech, and the speech can be generated by the text to speech function.

In some embodiments, the processing unit further comprises a user use log.

In some embodiments, the processing unit further comprises an auto save function.

In some embodiments, the processing unit further comprises an undo and/or a redo function.

In some embodiments, the processing unit further comprises a source data file creation module configured to allow a user to create a source data file. The user input module can comprise a microphone. The user input module can comprise a data transfer port. The user input module can comprise a text input device. The user created source data file can comprise a file selected from the group consisting of: audio file; video file; and combinations thereof. The source data file creation module can be configured to record video while previewing the output. The source data file creation module can further comprise a synchronization function configured to synchronize recorded video with the grid layout.

In some embodiments, the processing unit further comprises an error detection algorithm. The error detection algorithm can be configured to detect an undesired positioning of a source data file in the grid image. The error detection algorithm can be configured to produce a warning upon detection of an undesired event. The error detection algorithm can be configured to prevent preview of the output upon detection of an undesired event. The error detection algorithm can be configured to prevent creation of the output upon detection of an undesired event. The error detection algorithm can be configured to detect an undesired length of the grid layout. The system can further comprise a user upload function and the error detection algorithm detects one or more undesirable characteristics of a user uploaded file. The one or more source data files can comprise a matching score and the error detection algorithm can detect a poor compatibility between two or more source data files based on the matching score. The two or more source data files can be sequentially placed in the grid layout.

In some embodiments, the processing unit further comprises a tempo adjustment algorithm. The output file comprises a tempo between 50 beats/minute and 200 beats/minute.

In some embodiments, the processing unit further comprises a cell highlighting function configured to highlight one or more active cells. The highlighting function can modify a parameter of the highlighted cell, the modified parameter selected from the group consisting of: color; background image; text style; border style; and combinations thereof. The active cell can correspond to the current playback position of the output file.

In some embodiments, the processing unit further comprises a row highlighting function configured to highlight one or more active rows. The highlighting function can modify a parameter of the highlighted row, the parameter selected from the group consisting of: color; background image; text style; border style; and combinations thereof.

In some embodiments, the processing unit further comprises a beat count clock.

In some embodiments, the processing unit further comprises a beat metronome. The beat metronome can provide an aural and/or visual cue during playback for each cell on the grid layout.

In some embodiments, the processing unit further comprises a seek bar.

In some embodiments, the processing unit further comprises a beat indicator configured to indicate at least one of an active row or an active cell.

In some embodiments, the user input module comprises a device selected from the group consisting of: keyboard; mouse; trackball; touchscreen, microphone; camera; scanner; and combinations thereof.

In some embodiments, the user input module comprises a touchscreen, and the video monitor comprises the touchscreen.

In some embodiments, the user input module comprises a data transfer port. The data transfer port can comprise an element selected from the group consisting of: USB port; Firewire port; disk drive; Bluetooth port; Ethernet port; and combinations thereof. The data transfer port can be configured to allow a user to upload a user created data file. The data transfer port can be configured to upload a file selected from the group consisting of: source data file; electronic spreadsheet; graphics file; scanned paper document; and combinations thereof.

In some embodiments, the user input module comprises a microphone. The processing unit can be configured to respond to voice commands received via the microphone. The processing unit can be configured to create a source data file from sounds received via the microphone.

In some embodiments, the output comprises at least an audio file.

In some embodiments, the output comprises at least a video file.

In some embodiments, the output comprises at least an image. The image can comprise an image file. The image can comprise an image provided on paper.

In some embodiments, the output comprises at least one document. The document can comprise a text file or a spreadsheet. The document can comprise a document provided on paper.

BRIEF DESCRIPTION OF THE DRAWINGS

The foregoing and other features and advantages of the inventive concepts will be apparent from the more particular description of embodiments of the inventive concepts, as illustrated in the accompanying drawings in which like reference characters refer to the same parts throughout the different views. The drawings are not necessarily to scale, emphasis instead being placed upon illustrating the principles of the inventive concepts.

DETAILED DESCRIPTION

Figure 1:
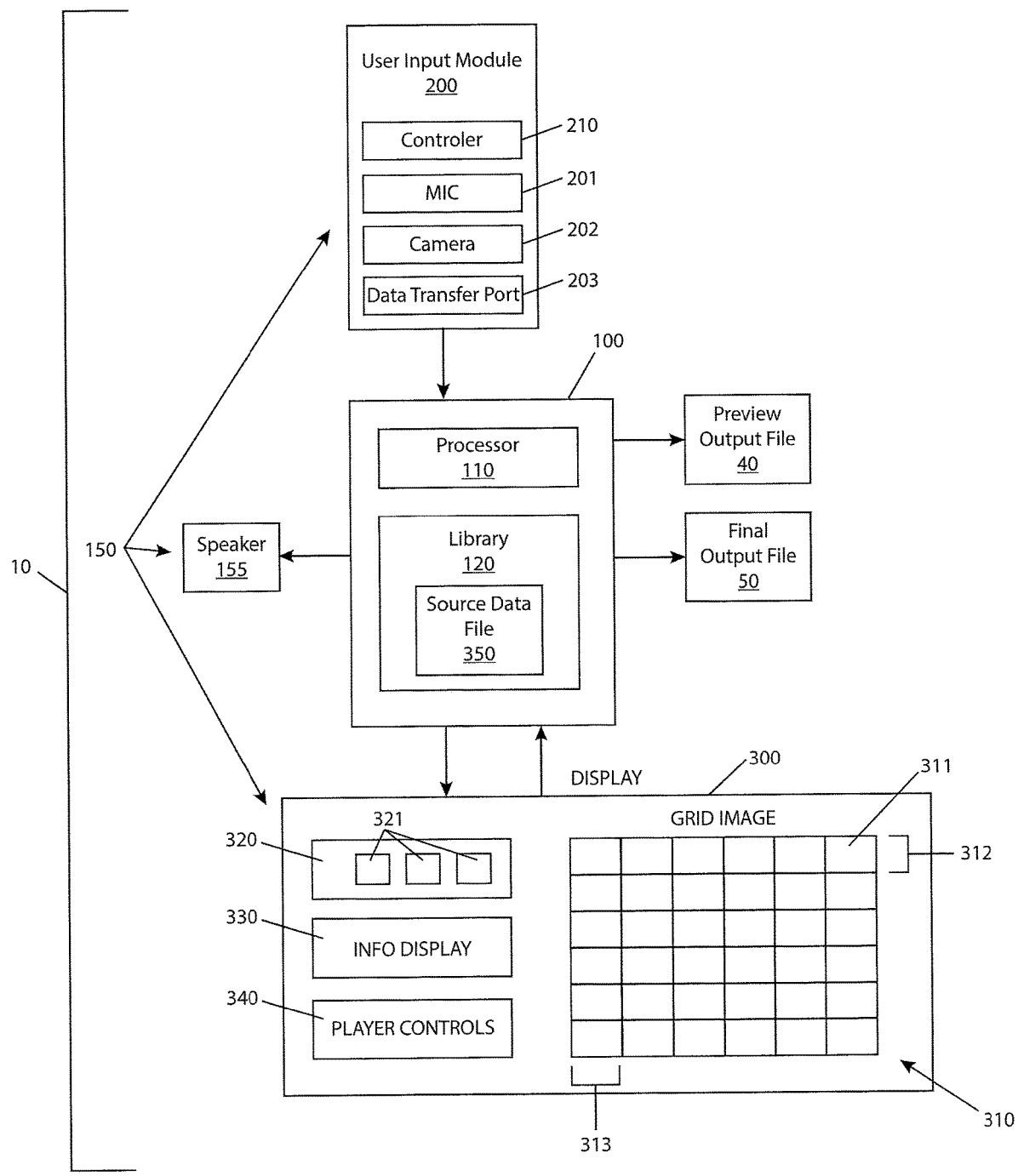
FIG. 1 illustrates a schematic view of a system for creating an output, comprising a processing unit configured such that a user can create an output representing the correlation between a grid layout and one or more source data files, consistent with the present inventive concepts.

Various example embodiments will be described more fully hereinafter with reference to the accompanying drawings, in which some example embodiments are shown. The present inventive concepts may, however, be embodied in many different forms and should not be construed as limited to the example embodiments set forth herein.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present inventive concepts.

Spatially relative terms, such as "beneath," "below," "lower," "above," "upper" and the like, may be used herein for ease of description to describe one element's or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The terminology used herein is for the purpose of describing particular example embodiments only and is not intended to be limiting of the present inventive concepts. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized example embodiments (and intermediate structures). As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. Thus, the regions illustrated in the figures are schematic in nature and their shapes are not intended to illustrate the actual shape of a region of a device and are not intended to limit the scope of the present inventive concepts.

Referring now to FIG. 1, a schematic view of a system for creating an output is illustrated, comprising a processing unit configured such that a user can create an output representing the correlation between a grid layout and one or more source data files, consistent with the present inventive concepts. System 10 can be configured to produce an output file 50. Output file 50 can comprise a file selected from the group consisting of: an audio file; a video file; an image file; a document; and combinations thereof. Output file 50 can be produced or otherwise generated using information associated with a grid layout as described herein.

System 10 includes processing unit 100, comprising at least one microprocessor, computer and/or other electronic controller, processor 110. User interface 150 can comprise user input module 200, video monitor 300, and one or more audio transducers, such as speaker 155. In some embodiments, system 10 is configured for operation by a user as described herebelow in reference to FIG. 2. Processing unit 100 can comprise one or more computers, such as a desktop or a laptop computer. User input module 200 can comprise a control device, controller 210, such as a device selected from the group consisting of: keyboard; mouse; trackball; touchscreen; microphone; camera; scanner; and combinations thereof. User input module 200 can further comprise one or more data capture devices, such as microphone 201 and/or camera 202. User input module 200 can further comprise a port for transfer of electronic data, data transfer port 203. Data transfer port 203 can comprise an assembly selected from the group consisting of: USB port; Firewire port; disk drive; Bluetooth port; Ethernet port; and combinations thereof. In some embodiments, processing unit 100 is configured to respond to voice commands received via microphone 201. Additionally or alternatively, processing unit 100 can be configured to respond to gesture-based control signals received via camera 202. Video monitor 300 can comprise a computer monitor, such as a laptop screen or desktop computer monitor. In some embodiments, video monitor 300 comprises a touch screen video monitor (e.g. video monitor 300 also functions as at least a portion of controller 210). User interface 150 can comprise components positioned local to processing unit 100 (e.g. in the same room or general area of processing unit 100), such as when processing unit 100 comprises a single computer, local to the user and user interface 150 is operably connected to processing unit 100 via a local wired or wireless connection. In alternate embodiments, user interface 150 can comprise components positioned local to the user (e.g. in the same room), and operably connected to at least one component of processing unit 100 via a remote connection, such as a network connection comprising the Internet (e.g. when user interface 150 and processing unit 100 are in separate rooms, separate buildings, separate cities and/or separate countries).

Processing unit 100 can comprise a computer positioned local to a user, and system 10 can comprise a stand-alone system, such as when system 10 comprises a program and data stored in memory (e.g. software) installed on and/or otherwise residing within the local computer. In alternative embodiments, processing unit 100 comprises multiple computers, such as multiple computers connected over a network, such as a network selected from the group consisting of: the Internet, a LAN, and combinations thereof. In these embodiments, processing unit 100 can comprise one or more computers selected from the group consisting of: desktop; laptop; server; storage device; tablet; phone; and combinations thereof. In some embodiments, system 10 is configured to provide an Internet-based user interface, such as a user interface where video monitor 300 is positioned local to the user and the display is generated via a web interface. In these embodiments, user input 200 can comprise one or more user input devices positioned local to the user and commands from input 200 can be received by the web interface. In some embodiments, at least one computer of processing unit 100 is configured to support multiple users simultaneously. The multiple users can be positioned remote from the at least one computer, such as when the at least one computer comprises a server hosting multiple users via a web-based user interface. The at least one computer configured to host multiple users can be configured to perform multi-threaded processing and/or it can comprise multiple processors 110. In some embodiments, processing unit 100 is configured to be operated by one or more users, such as when individual or group operator access is managed by a login function comprising a password and/or permissions routine. For example, multiple users can have unique login information, stored by one or more memory portions of processing unit 100. Individual or group users can have differing permission levels, such as either user level permissions or administrator level permissions.

Video monitor 300 is operably connected to processing unit 100, and processing unit 100 can provide an array of cells configured to be populated, grid image 310, on video monitor 300. Processing unit 100 can further provide an area including selectable icons, selection area 320, on video monitor 300. In some embodiments, processing unit 100 also provides an area for user information, information display 330, and/or one or more user selectable controls, controls 340, on video monitor 300.

Grid image 310 comprises multiple cells 311. Each cell 311 can represent a duration of time, such that grid image 310 represents a time duration equal to the sum of the time durations of each cell 311. In some embodiments, grid image 310 can comprise multiple rows 312, each row 312 comprising at least one cell 311. In some embodiments, each row 312 comprises at least 4 cells 311, such as 8 cells 311. In some embodiments, the total number of rows 312 in grid image 310 can be set based on an input received from a user, and the total number of cells 311 per row 312 (i.e. the total number of columns 313 in grid 310) can also be set based on an input received from a user. In some embodiments, processing unit 100 is configured to allow a user to add and/or remove one or more rows 312 to/from grid image 310. Processing unit 100 can be further configured to allow a user to add and/or remove one or more cells 311 to and/or from one or more rows 312 (e.g. add and/or remove a column to and/or from grid 310). In some embodiments, each row 312 has the same number of cells 311.

In some embodiments, each cell 311 can be associated with a beat of music, such as when the output created by system 10, preview output file 40 and/or final output file 50 (generally output file 50), comprises an output representing or otherwise correlating to a musical score. Processing unit 100 can be configured to set the duration of time represented by each cell 311 based on an input from a user. In some embodiments, a user can input a desired number of beats per minute, and processing unit 100 can determine the time duration represented by each cell 311 in order to correlate to the desired beats per minute. The time duration represented by each cell 311 can comprise a time of between 0.25 seconds and 1.0 seconds. Multiple cells 311 can comprise similar or dissimilar durations of time.

Processing unit 100 can further provide a selection area 320, on video monitor 300. Selection area 320 comprises multiple selectable icons (e.g. each configured for "drag and drop", as described herebelow in reference to FIG. 3), select icons 321. Each select icon 321 represents one or more source data files 350. Each source data file 350 can comprise a file selected from the group consisting of: audio file; music file; sound effect file; voice over file; text file; image file; video file; and combinations thereof. Each source data file 350 can be stored in a portion of computer memory, such as library 120 of processing unit 100. In some embodiments, library 120 comprises a segment of memory located on a separate server or other computer configured to provide processing unit 100 access to source data files 350, such as via a network as described hereabove. In some embodiments, one or more select icons 321 can comprise a text image. Processing unit 100 can be configured to allow a user to enter text to be displayed on a select icon 321. Processing unit 100 can be further configured to allow a user to edit text displayed on a select icon 321.

In some embodiments, a source data file 350 can comprise an audio file, such as when the audio file comprises a music file, a sound effect audio file, and/or a voice-over audio file. Each source data file 350 comprising an audio file can further comprise audio information, such as information selected from the group consisting of: text description of audio file; duration of audio file; performer of audio file; composer of audio file; artist associated with audio file; user cost of audio file; a timing offset associated with audio file; and combinations thereof. In some embodiments, processing unit 100 is configured to display the audio information associated with one or more source data files 350 on video monitor 300, such as information provided by processing unit 100 within information display area 330, as described herebelow in reference to FIG. 3. In some embodiments, the audio information can comprise amplitude information, such as when the amplitude information is adjustable by a user, such as to manipulate the amplitude of an audio source data file 350 with respect to other audio source data files 350 used by system 10. In some embodiments, the audio information can comprise timing offset information and/or timing trail-off information, such as is described in detail herebelow in reference to FIG. 6.

In some embodiments, a source data file 350 can comprise an image file, a text file, and/or a video file. Each source data file 350 can be represented by a unique select icon 321, having a width (e.g. a width as displayed on video display 300) correlating to the width of cells 311 of grid 310, and/or the length of the audio and/or video file associated with the select icon 321. For example, a select icon 321 representing an audio file with a length of 4 seconds, displayed on a grid 310 comprising a cell 311 width of 0.5 seconds, can comprise a width equal to eight cells 311. In some embodiments, source data files 350 do not have an associated length (e.g. the length of an audio track), and the width of the associated select icon 321 can be user defined. A source data file 350 comprising an image file can correlate to a select icon 321 with a width which can be resizable by a user. Image source data file select icons 321 can include one or more image attributes and/or annotations. Image source data files select icons 321 can include a thumbnail preview of the image, such as a thumbnail image represented on the corresponding select icon 321.

A source data file 350 comprising a text file can correlate to a select icon 321 with a width which can be resizable by a user. Text source data file select icons 321 can comprise user editable text and or user editable font formatting options (e.g. fonts, colors, or text size). A source data file 350 comprising a video file can correlate to a select icon 321 with a width which can be resizable by a user. Video source data file select icons 321 can include one or more video attributes and/or annotations. Video source data file select icons 321 can include a user selectable thumbnail preview of the video file.

In some embodiments, system 10 includes a cost calculation module, configured to provide cost information related to the one or more source data files and or the final output 50. In some embodiments, the cost information can be displayed, such as in information display area 330, and can be dynamically updated as the grid layout is modified by a user. The cost calculation module can be configured to adjust the cost based on one or more of: length associated with the output; source data files included in the output; and cost reduction associated with a user.

Figure 2:
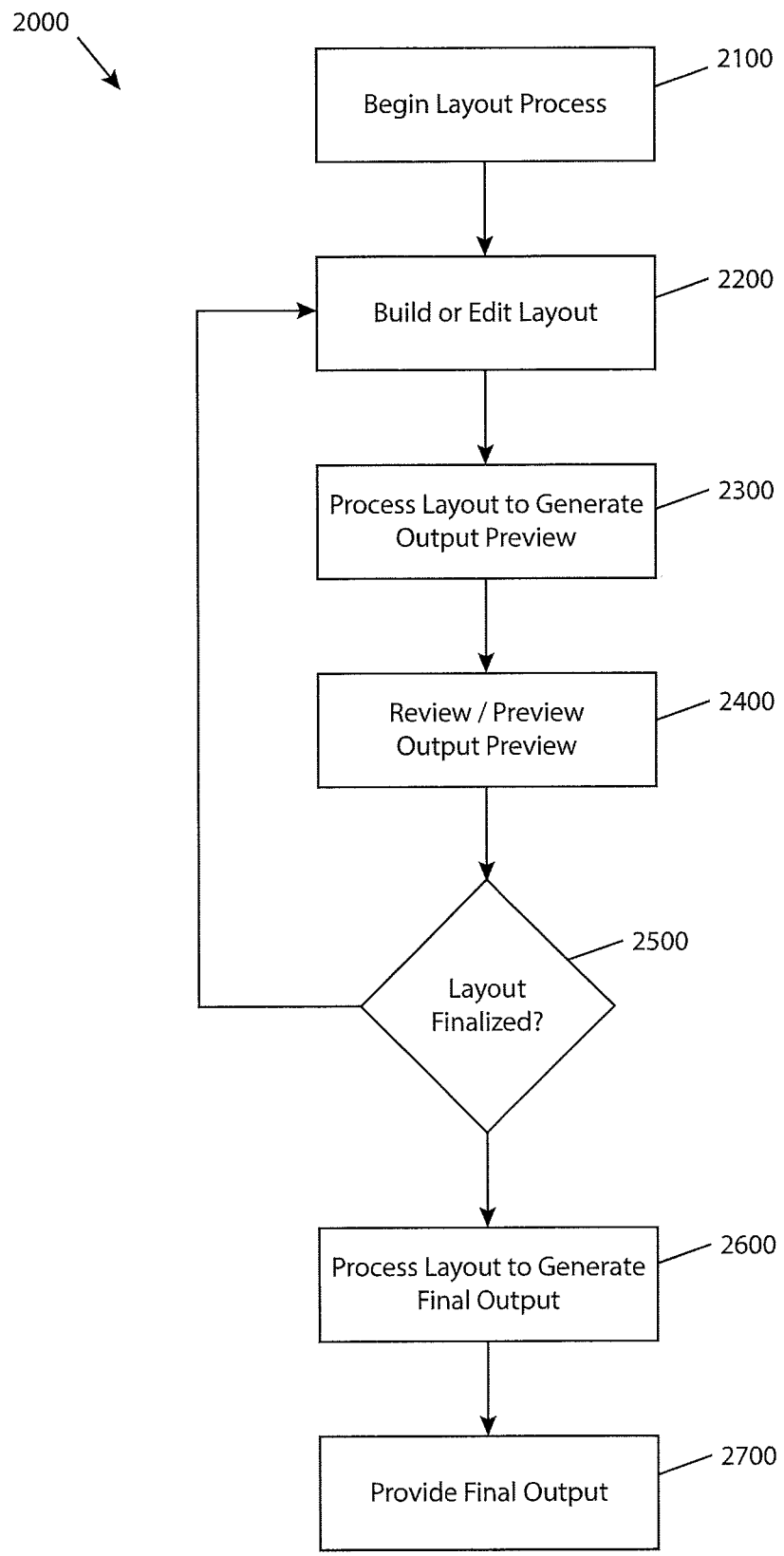
FIG. 2 illustrates a method of creating an output based on a correlation between one or more files, consistent with the present inventive concepts.

Referring now to FIG. 2, a method of creating an output based on a correlation between one or more files is illustrated, consistent with the present inventive concepts. In some embodiments, process 2000 of FIG. 2 is accomplished using system 10 described herein. Process 2000 comprises a series of steps for creating an output 50 based on a correlation between one or more source data files 350 and multiple cells 311 of a grid layout.

In step 2100, a user begins the process of creating a grid layout by placing select icons 321, representing source data files 350, onto a grid image 310, correlating the select icons to one or more cells 311 of the grid image 310. To begin the process, a user can open a program (e.g. a software program), log onto a web-based interface, or otherwise initiate the correlation process. In some embodiments, system 10 can comprise a "save" function, such that a user can save a preliminary or other grid layout, such as to continue editing at a later time. In step 2100, a previously saved grid layout can be loaded into the program for further editing. In some embodiments, system 10 can comprise a user login function, such that a user can log in to system 10 and generate a grid layout in a customized environment. A customized environment can include an environment customized by modifying one or more variables selected from the group consisting of: user specific permissions; access to user generated source data files 350; custom settings predefined or editable by the user; a library of saved grid layouts or grid layout templates specific to the user; a log of user events; and combinations of these.

In some embodiments, the user can define and/or modify the characteristics of the output file to be generated. System 10 can comprise a tempo adjustment algorithm, allowing the user to set the tempo of the final output file 50 to be generated. In some embodiments, the tempo of the output file can be set to a tempo of between 50 beats/minute and 200 beats/minute. In some embodiments, the user can set the length of the final output file 50 to be generated. In some embodiments, the user can set the number of cells 311 per row 312 to be shown on grid image 310 representing the final output file 50. System 10 can comprise default settings for a grid layout representing an output file 50. For example, the default settings for a grid layout representing a music-based output file 50 can comprise a grid image 310 comprising 8 rows 312 of cells 311, and can comprise a duration of approximately 2 minutes and 30 seconds, with a tempo of approximately 144 beats per minute (i.e. 45 rows 312 of 8 cells 311 each).

In step 2200, the user begins to populate or otherwise edit the grid layout. The user can place at least one select icon 321 onto grid image 310, correlating the select icon to at least one cell 311 in grid image 310. An example of a grid layout is described in detail herebelow in reference to FIG. 3.

In some embodiments, system 10 can provide "drag and drop" type functionality. In these embodiments, the user can actively select (e.g. actively select with a cursor) a select icon 321 from selection area 320. The user can then drag (e.g. move the cursor with the icon actively selected) the icon 321 to a location relative to grid image 310 (e.g. within and/or otherwise proximate a desired cell 311). The user can then drop (e.g. release the active selection of the icon) the icon 321 onto grid image 310. This drag and drop functionality can also be used to move select icons 321 from one location to another relative to grid image 310, or to remove select icons 321 from grid image 310 (e.g. by dragging back to select area 320 or otherwise dragging away from grid image 310). The user can actively select multiple select icons 321 (e.g. by holding the shift key while selecting multiple icons 321) and drag and drop the multiple select icons 321 simultaneously from selection area 320 to grid 310 and/or about grid 310. The user can select one or more select icons 321 already correlated to grid image 310 and move the selected select icons 321 within and/or otherwise about grid image 310 with arrow keys, such as arrow keys of a keyboard (for example, the user can move the selected select icon 321 one cell 311 to the right by pressing the right arrow key).

In some embodiments, the user can associate a select icon 321 with a cell 311 by directly selecting a cell 311 and inputting text (e.g. via a keyboard). Processing unit 100 can correlate the text entered by the user to a specific select icon 321 (e.g. a select icon 321 representing a unique source data file 350) and place the correct select icon 321 on the grid image relative to (e.g. within or otherwise proximate) the selected cell 311. System 10 can prompt the user to confirm the correct select icon 321 is chosen. Alternatively or additionally, system 10 can provide a filtered list of select icons 321 for the user to select from, such as a list based on the text entered (e.g. a lookup menu).

In some embodiments, process 2000 includes use of voice commands, such as when system 10 comprises a voice recognition algorithm. The voice recognition algorithm can be configured to receive commands via a microphone and manipulate the grid layout via recognized commands received.

In some embodiments, process 2000 includes use of a copy and paste function, such as when system 10 is configured to provide a copy and paste function. The user can select a select icon 321 and/or group of select icons 321, copy the selection, and paste the selection onto the grid image 310. The selection can be pasted in place (i.e. with the same correlation to grid image 310 as the copied select icons 321) or the paste function can allow for the placement to be unique and user selectable.

In some embodiments, process 2000 includes the user logging in to system 10, such as when system 10 comprises a user action recording function. A user log can record a log of the user's actions while using system 10, such as during step 2200 or any step of process 2000. The log can include recorded events selected from the group consisting of: keystrokes; selections such as icons 321 selections; placement of select icons 321; deletions of select icons 321 from grid image 310; movement of select icons 321 within and/or about grid image 310; previewing of source data files 350; and combinations of these.

In some embodiments, process 2000 includes automatically saving commands and/or results of commands performed by a user, such as when system 10 comprises an auto save function. The auto save function can periodically save the grid layout created by the user, such as every 5 minutes, or every 2 minutes. The auto save function can save the grid layout continuously, for example when each modification made by the user is recorded in a user log, and the grid layout is saved after each modification. System 10 can further comprise undo and redo functionality, such that the user can undo one or more modifications, and/or redo one or more modifications that have been previously undone (unless what is done cannot be undone).

In some embodiments, process 2000 includes previewing of one or more audio, video and/or image files, such as when system 10 comprises a preview function for one or more individual source data files 350 during the grid layout process. In these embodiments, one or more select icons 321 can comprise a preview button, as described further herebelow in reference to FIG. 3. The preview button can allow the user to preview at least a portion of the source data file 350 selected. The preview of the source data file 350 can comprise an "overlay" or other deterrent to dissuade the user from copying (e.g. recording audio or capturing a screen shot of an image file) the previewed file. In some embodiments, the source data file 350 to be previewed comprises an audio file. The audio file can comprise a sound overlay, or other degradation or branding of the previewed audio. In some embodiments, the preview comprises a visual preview (e.g. preview of an image, video, or document) and the visual preview can comprise a visual overlay (e.g. a watermark), or other degradation or branding of the previewed image. The source data file 350 can comprise the overlay and/or system 10 can dynamically apply the overlay during preview of the source data file 350. In some embodiments, the overlay can comprise alphanumeric data.

In some embodiments, process 2000 includes placing an overlay on one or more previewed source data files 350, such as when system 10 comprises an algorithm for placing overlays on one or more previewed source data files 350. The algorithm can dynamically place the overlay during and/or prior to previewing of the source data file 350. The location (e.g. the timing during audio playback or location on a visual preview) can be computed by the algorithm. The algorithm can generate sound overlays with varying characteristics from one or more overlay audio files. The varying characteristic can be selected from the group consisting of: the pitch of the overlaid audio; the speed of the overlaid audio; the frequency of the overlaid audio; the offset from the beginning and/or end of the source data file 350 being previewed; and combinations thereof.

In some embodiments, the algorithm can place overlays onto source data files 350 (i.e. modify the file itself), and system 10 can be configured to remove the overlay. The overlay can be removed to generate a preview output file 40 and/or a final output file 50 without the overlay. A preview output file 40 can have additional overlays added during the preview creation process, as described herebelow.

In step 2300, system 10 processes the user created grid layout to generate a preview output file 40 of the custom grid layout. In some embodiments, the final output file 50 to be generated comprises an audio output, and the preview output file 40 comprises an audio file generated by system 10 based on the correlation between select icons 321 represented on grid image 310. Preview output file 40 can comprise an overlay or other deterrent (as described hereabove) to dissuade the user from using preview output file 40 for an unauthorized use (e.g. the intended use of final output file 50).

The preview output file 40 can comprise the overlaid source data files 350 described above, producing a preview output file 40 comprising multiple overlays. In some embodiments, system 10 removes all overlays from source data files 350 used (or the system comprises source data files 350 without overlays, and system 10 dynamically overlays any previewed file) and system 10 dynamically generates a new pattern of overlays for the preview output file 40. System 10 can comprise an algorithm for dynamically placing one or more overlays on a preview output file 40, such as one overlay every 15 seconds placed on an audio or video-based preview output file 40. The number of overlays applied can be determined dynamically by system 10, or it can be based on the length of the grid layout. One or more source data files 350 can require an overlay during any preview (e.g. playback). An algorithm can be configured to avoid placing more than one overlay on top of or within a predetermined distance (time span) of one another.

System 10 can be configured to generate an audio file (e.g. a custom musical mix). Processor 100 can be configured to "master" the cumulative set of selected source data files 350, generating an output 50 correlating to the grid layout created. Mastering can include a process selected from the group consisting of: summing; combining; manipulating; processing; mastering; equalizing; compressing; filtering; delaying; adding reverb; adding harmonic excitement; and combinations thereof. The mastering performed can include a set of processes configured to produce an output file with unique characteristics. For example, a first set of processes can produce an output file with a crisp sound and exaggerated bass line, and a second set of processes can produce an output file with a full sound and smoother transitions. The sets of processes can be predefined or user editable. In some embodiments, system 10 is configured to allow the user to select from a set of predefined mastering process sets, wherein each set provides a unique sound or effect. System 10 can provide at least one user selectable sound processing effect to be used in the mastering process. In some embodiments, system 10 is configured to allow the user to select at least two of the following effects: edgy, smooth, warm, bright, and distorted.

Figure 4:
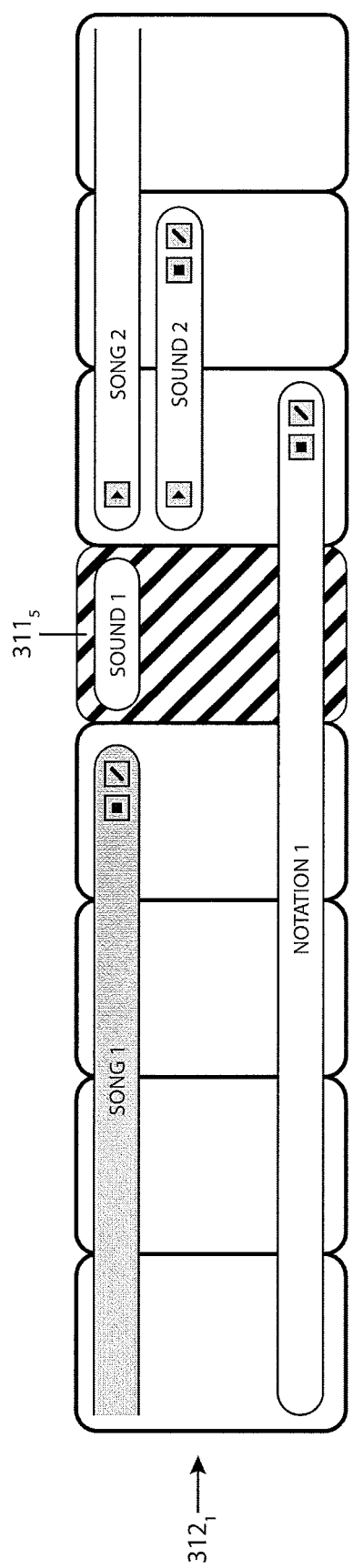
FIG. 4 illustrates a portion of a grid image containing an error, consistent with the present inventive concepts.

In some embodiments, in step 2300, system 10 analyzes the grid layout for any errors, before generating a preview output file 40 and/or final output file 50, as described in detail herebelow in reference to FIG. 4.

In step 2400, system 10 provides the preview output file 40 for the user to review. In some embodiments, system 10 can stream, or otherwise provide a preview output file 40 without providing the user with access to the file itself (e.g. to prevent the user from saving the preview output file 40). System 10 can further provide information to the user correlating to the preview output file 40 and/or the final output file 50 represented by preview output file 40. The information provided can include information selected from the group consisting of: final price information; duration; artists featured; beats per minute; other information pertaining to the final output file to be generated; and combinations of these.

In step 2500, the user decides if the grid layout is complete. The user can repeat one or more of steps 2200 through 2500 until preview output file 40 represents a composition the user wishes to finalize and purchase. After the user decides the grid layout is finalized, system 10 proceeds to step 2600.

In step 2600, system 10 processes the grid layout to produce a final output file 50. Step 2600 can comprise mastering, such as mastering similar or dissimilar to the mastering performed in step 2300 described hereabove. In step 2600, system 10 can remove any overlays from source data files 350 used in generating the final output file 50.

In step 2700, system 10 provides final output file 50 to the user. In some embodiments, system 10 can provide final output file 50 via a shopping cart function. After finalization of final output file 50, system 10 can generate an item for purchase in an online store (e.g. web-based store), and direct the user to purchase the item via the online store. The user can purchase one or more final output files 50 (e.g. the user can create multiple grid layouts, generating multiple unique final output files 50). After purchasing the final output file 50, system 10 can host final output file 50 for download by the user, email the user final output file 50, and/or otherwise provide the user with access to final output file 50. In some embodiments, system 10 can comprise merchant type service, allowing the user to purchase and download final output file 50 without the use of an online store, such as when system 10 is configured in a stand-alone single computer configuration, and a unique key can be provided (e.g. by the manufacturer of system 10) after a payment is made.

Figure 3:
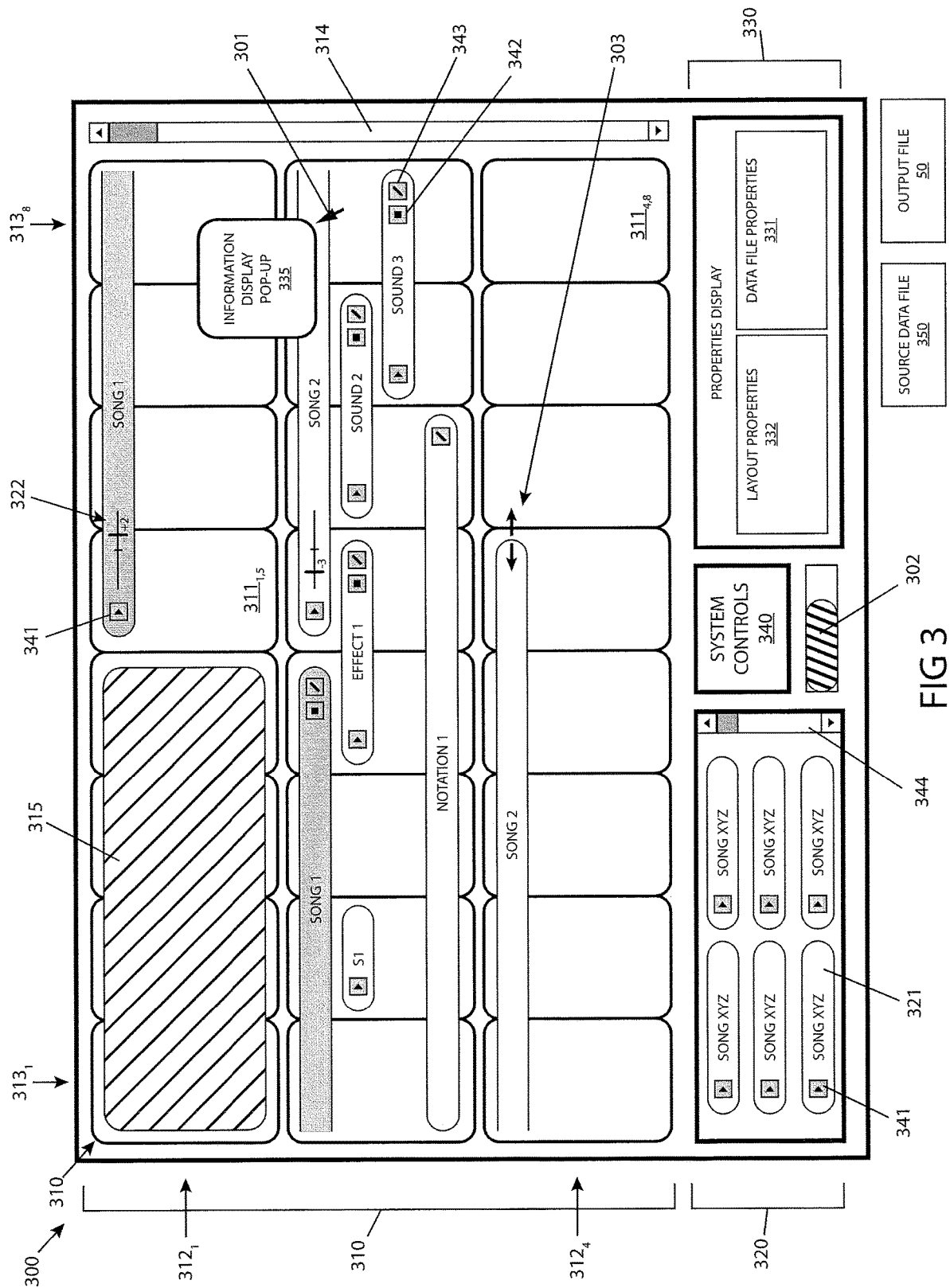
FIG. 3 illustrates a video display comprising a grid image correlating multiple select icons to multiple cells, consistent with the present inventive concepts.

Referring now to FIG. 3, a video display comprising a grid image correlating multiple select icons to multiple cells is illustrated, consistent with the present inventive concepts. Video display 300 can comprise an image displayed on a display device such as a computer monitor, a tablet, Google Glass, a holographic display, or the like. Processing unit 100 of system 10 can be configured to provide the image to be displayed on video display 300. Processing unit 100 can generate a user controlled pointer, cursor 301. The position of cursor 301 can be user controlled such as via a touch pad or a mouse.

Video display 300 includes grid image 310 comprising multiple cells 311. In the embodiment of FIG. 3, grid image 310 comprises eight columns 313, $313_1$ through $313_8$. Video display 300 is shown displaying the first four rows 312 of grid image 310, $312_1$ through $312_4$. Display 300 can include a scroll bar or other horizontal and/or vertical screen navigation tool, scroll bar 314, configured to allow a user to scroll through grid image 310, for example to one or more rows 312 beyond (i.e. below) row $312_4$ shown.

In some embodiments, one or more cells 311 can be blocked, or otherwise disabled by system 10, such that a user cannot associate one or more select icons 321 with the one or more blocked cells 311. Video display 300 can display a blocking icon 315, such as to indicate to a user that one or more cells 311 are blocked. In some embodiments, the first four cells of grid 310 are blocked, such as to represent a lead-in time for a musical score (e.g. the musical score starts on a fifth beat of the score).

Video display 300 includes selection area 320. Selection area 320 displays multiple select icons 321 representing multiple source data files 350, such as multiple source data files 350 stored in library 120 of system 10. Selection area 320 can further include a scroll bar 344, configured to allow a user to scroll through the select icons 321. System 10 can include a sort and/or filter function configured to allow a user to sort and/or filter icons displayed in selection area 320. For example, selection area 320 can include a sort function configured to allow a user to sort select icons 321 by type (e.g. songs, sound effects, voice overs, and other types described hereabove in reference to FIG. 1). The sort function can be further configured to sort by source data file 350 characteristics, such as length, artist, cost, title, and the like. System 10 can include a filter function configured to allow a user to filter select icons 321 included in selection area 320, by one or more source data file 350 characteristics, such that only the filtered select icons are displayed in selection area 320. Selection area 320 and/or select icons 321 can include a play button 341 configured to play a preview of the associated source data file 350. For example, for an audio source data file 350, play button 341 can be configured to trigger processing unit 100 to play a preview audio file, such as through speaker 155 of system 10 of FIG. 1. The preview audio file can comprise an overlay as described hereabove in reference to FIG. 2. Play button 341 can be configured to pause a preview being played. In some embodiments, processing unit 100 can be configured such that the initiation of a preview of a first source data file 350, while a preview of a second source data file 350 is active (e.g. being played), will terminate the preview of the second source data file 350 before activating the subsequently initiated preview.

Video display 300 can include one or more progress indicators and/or other status indicators, status bar 302. Status bar 302 can be constructed and arranged to display the status of a process selected from the group consisting of: audio processing (e.g. preview output processing and/or final output processing); grid layout completion; playback completion; and combinations thereof.

Video display 300 can further include a set of system function controllers, controls 340. Controls 340 can be configured to control play, pause, and/or stop functions related to the playback of one or more preview output files 40 and/or final output files 50. Controls 340 can further include controls for modifying system parameters, such as the length or tempo of the associated output file 40, 50 to be generated using system 10. Controls 340 can further include controls for activating one or more system subroutines, such as a source data file 350 modification subroutine, as described herebelow in reference to FIG. 6. Controls 340 can further include one or more controls configured for generating a preview output file 40 and/or a final output file 50. Controls 340 can further include controls configured to perform a function selected from the group consisting of: undo function; redo function; copy and paste functions; save function; user log in/log out function; open previous grid layout function; delete function; and combinations thereof.

Video display 300 can include information display 330. Information display 330 can comprise a source data file property display area 331 and/or a grid layout property display area 332. Source data file property display area 331 (herein display area 331) can display properties and/or other information regarding one or more source data files 350, such as one or more source data files 350 correlating to one or more highlighted select icons 321. In the embodiment of FIG. 3, SONG 1 represents a select icon 321, displayed on grid 310, which has been selected (e.g. and highlighted) by the user. Displayed information can include information selected from the group consisting of: text description of audio file; duration of audio file; performer of audio file; composer of audio file; artist associated with audio file; cost of audio file; offset associated with audio file; and combinations thereof.

Grid layout property display area 332 (herein display area 332) can display properties and/or other information regarding the current grid layout 310, and/or other system 10 properties or settings. Grid layout information can include information selected from the group consisting of: grid layout length; grid layout tempo; grid layout associated cost; percentage of cells comprising at least one select icon 321; errors associated with the current grid layout; and combinations thereof.

In some embodiments, processing unit 100 can be configured to display one or more pop-up windows, such as information display pop-up 335 (herein pop-up 335) as shown. Processing unit 100 can be configured such that pop-up 335 is displayed when a user hovers a cursor or other selection tool over a portion of video display 300 (e.g. places cursor over a particular portion and holds that position for at least 1 second), and the portion of display 300 contains an element which comprises or is otherwise associated with information to be displayed. For example, in the embodiment of FIG. 3, cursor 301 is shown hovering over SONG 2, and pop-up 335 is displayed. In this example, pop-up 335 can display information regarding SONG 2, such as information selected from the group consisting of: text description of audio file; duration of audio file; performer of audio file; composer of audio file; artist associated with audio file; cost of audio file; offset associated with audio file; and combinations thereof. In some embodiments, information can be displayed on select icon 321, such as the title of the associated source data file 350 or the length of the represented file (e.g. length of the audio file represented).

In some embodiments, one or more select icons 321 can comprise one or more controls. Select icons 321 with one or more controls can be positioned within display 300 at one or more locations, such as grid image 310 and selection area 320. Controls displayed on a select icon 321 can be similar or dissimilar within grid 310 to a select icon within selection area 320. On grid 310, select icon(s) 321 can include a play/pause button 341, a stop button 342, and/or an edit button 343. Buttons 341 and 342 can be configured to control the preview playback of the associated source data file 350. Edit button 343 can be configured to activate a subroutine configure to allow a user to edit the associated source data file 350, as described herebelow in reference to FIG. 6. Select icon(s) 321 can further include one or more controls configured to manipulate one or more properties of the associated source data file 350. For example, as shown in FIG. 3, SONG 1 comprises a volume control slider 322. Volume control slider 322 can be configured to adjust the volume of source data file 350 with respect to other source data files 350 correlated to grid 310. In the embodiment shown, SONG 1 comprises a volume raised 2 units, and SONG 2 comprises a volume lowered 3 units. A unit can comprise a relative percentage, a scaled relative percentage, a decibel level, or the like.

In the embodiment shown in FIG. 3, seven select icons 321 are shown correlated to grid image 310. The following description represents an example of a correlation in process of being created representing an audio file, and is only intended to represent one possible use of the system of the present inventive concepts. SONG 1 comprises a length approximately equal to eight beats, and is displayed starting in cell $311_{1,5}$ and ending in cell $311_{2,4}$. SONG 2 comprises a length of approximately equal to nine beats and is displayed starting in cell $311_{2,5}$ and ending in cell $311_{3,5}$. As described herebelow in reference to FIG. 6, a source data file 350 can comprise a length greater than the length displayed by the corresponding select icon 321. Source data files 350 can comprise lead-in offset times and or fade-out offset times not represented by select icon 321. In some embodiments, the first "down beat" of an audio file is represented by the start of the associated select icon 321, although the associated audio begins before the beat indicated by the placement of the associated select icon 321. In some embodiments, the user can resize the select icon 321, as shown by arrows 303 associated with SONG 2. The resizing of select icon 321 can be configured to truncate, or otherwise modify the length of the associated source data file 350 during generation of the preview output file 40 and/or final output file 50 (generally output file 50).

One or more select icons 321 can be configured to allow a user to cause system 10 to apply an "effect", such as EFFECT 1, configured to indicate a particular effect to be used during the generation of the output file 50. For example, EFFECT 1 comprises a length of two beats and is shown on cells $311_{2,4}$ and $311_{2,5}$, and can comprise a cross fade effect, configured to fade SONG 1 into SONG 2.

The embodiment shown in FIG. 3 comprises three sound effect select icons, S1, SOUND 2, and SOUND 3. In some embodiments, titles and/or other text associated with a select icon can be truncated (e.g. S1) such that the text fits within the associated select icon 321. S1 is shown on cell $311_{2,2}$ and overlaps SONG 1. SOUND 2 and SOUND 3 are shown on cells $311_{2,6}$ and $311_{2,7}$, and $311_{2,7}$ and $311_{2,5}$, respectively. SOUND 2 and SOUND 3 overlay SONG 2 and overlap each other in cell $311_{2,7}$. During generation of an associated output file 50, processing unit 100 can be configured to merge or otherwise combine multiple overlapping source data files 350 as shown.

A user can insert one of more notation select icons, for example NOTATION 1 onto grid 310. NOTATION 1 is shown starting on cell $311_{2,1}$ and ending on cell $311_{2,6}$. Notation select icons can be configured to allow a user to create notes within and/or about grid layout 310, such as without affecting the output file 50 to be generated.

Source data files 350 can include information correlating to the appearance of the associated select icons 321 which can comprise one or more display properties, such as properties selected from the group consisting of: color of select icon; font of text within select icon; properties of text within select icon (e.g. bold or italic); height of select icon; transparency of select icon; and combinations thereof. The source data file 350 information can determine the appearance of the associated select icon 321 on video display 300. In some embodiments, all select icons 321 of a particular type (e.g. songs, video files and notations) can comprise at least one similar visual characteristic. Source data files 350 can further include information correlating to the position of the associated select icon 321 as it is displayed in grid 310. The position information can include vertical position information (e.g. whether the icon is placed at the top or bottom of the associated cell 311) and/or stack order information (e.g. song select icons can be ordered and displayed "on top of" sound select icons, as shown). In some embodiments, rows 312 can grow in height to accommodate the placement of more select icons 321 with a cell 311.

Referring now to FIG. 4, a portion of a grid image containing an error is illustrated, consistent with the present inventive concepts. System 10 can comprise an error detection algorithm, configured to alert a user if the grid layout comprises one or more undesirable or unacceptable conditions. In some embodiments, the error detection algorithm is configured to detect an undesired position of one or more select icons 321 on grid image 310. FIG. 4 illustrates a row 312 (such as row a row 312 of grid image 310 of FIG. 3 described hereabove), containing an error in cell $311_5$. System 10 can modify one or more visual characteristics of a cell 311 containing an error. System 10 can alert the user via an audio or visual alert, such as a pop-up message that appears when a user initiates an output 50 generation process. In some embodiments, a particular pattern of one or more select icons 321 can cause an error condition, such as a single select icon associated with a cell 311 without at least a second select icon associated with the same cell 311 (e.g. such that output file 50 would comprise a portion with only the audio from a single source data file 350). In some embodiments, an undesired length of the grid layout can cause an error condition, such as a grid layout which is too short or too long.

In some embodiments, system 10 can be configured to analyze the grid layout, and determine if one or more source data files 350 are associated such that a poor correlation exists (e.g. two songs are associated which would not sound good paired together). For example, two or more source data files 350 can each comprise a tempo which can be poorly compatible with each other and/or with the desired tempo of the output file 50. In some embodiments, source data files 350 can comprise one or more weighted numeric values, such as a beginning value and an ending value. In some embodiments the weighted values can be configured to assist the user in creating the grid layout (for example, only matching values or similar values should be placed in neighboring cells). In some embodiments, the values can be represented via text, image, color, and/or a pattern within the corresponding select icon 321. The weighted values can be determined by the system and/or set by a user or administrator of the system.

System 10 can be configured that one or more errors detected prevent processing unit 100 from generating an output 50. In some embodiments, system 10 can provide a warning if an error condition exists, however allow a user to override the warning to produce an output file 50.

Figure 5A:
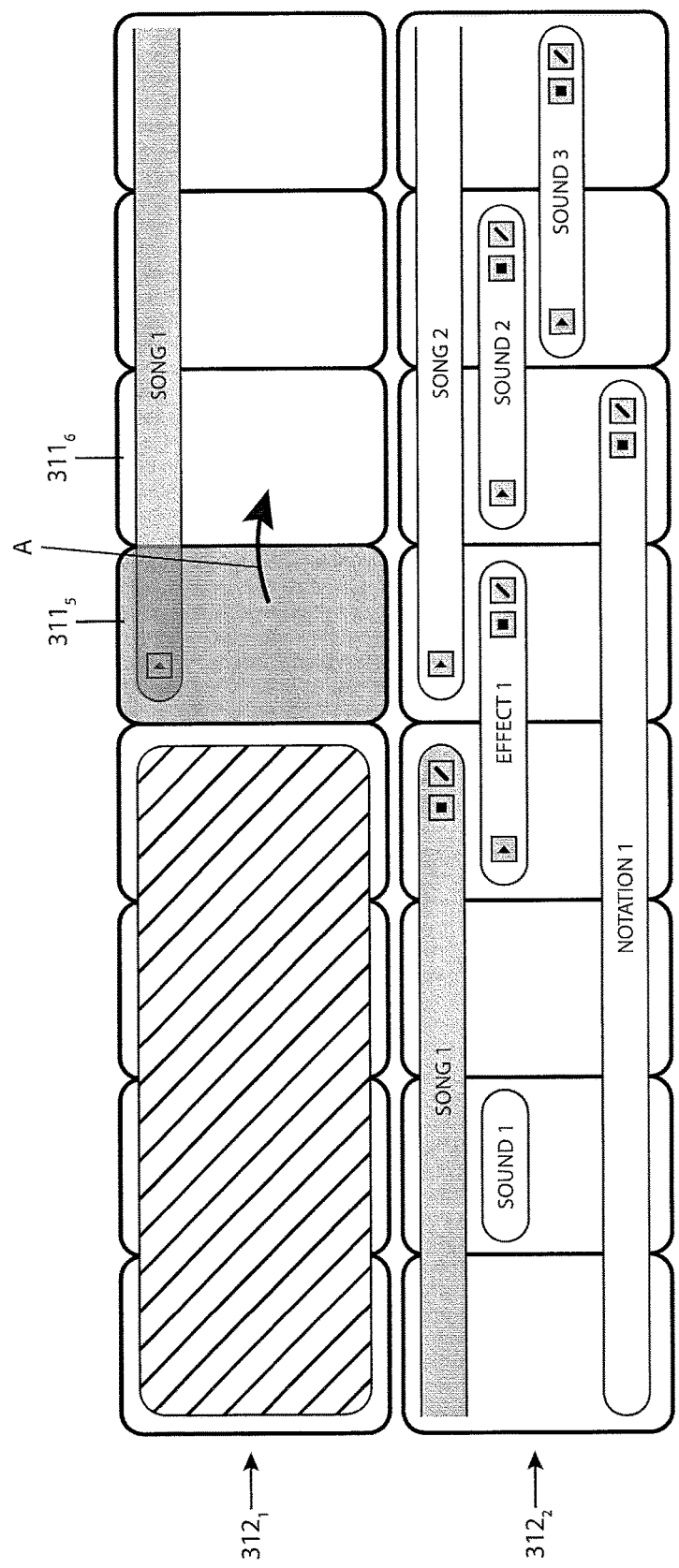
FIGS. 5A and 5B illustrate a portion of a grid image comprising a beat indicator, and a seek bar comprising a position indicator, consistent with the present inventive concepts.
Figure 5B:
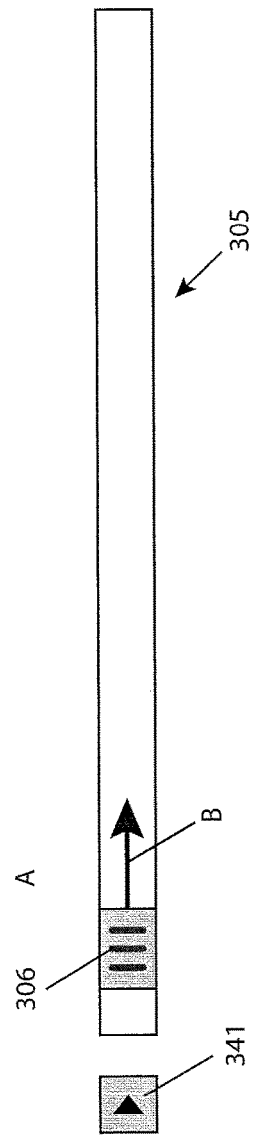

Referring now to FIGS. 5A and 5B, a portion of a grid image comprising a beat indicator is illustrated in FIG. 5A, and a seek bar comprising a position indicator are illustrated in FIG. 5B, consistent with the present inventive concepts. FIG. 5A illustrates two consecutive rows $312_1$ and $312_2$ (such as two consecutive rows 312 of grid image 310 of FIG. 3 described hereabove). FIG. 5B illustrates a seek bar 305, comprising position indicator 306, configured to represent the time index or current playback position of the associated output file 50 being played by system 10 (e.g. a musical preview output file 40 and/or musical output file 50 being played through speakers of system 10). System 10 can further comprise a button for playing and/or pausing the playback of the output file 50, play button 341.

System 10 can comprise an active cell highlight function, configured to highlight one or more active cells 311. The highlighting function can comprise altering a visual property of the active cell(s) such as a property selected from the group consisting of: cell color; cell background color; image displayed within a cell; cell text color; cell text attribute, such as bold or italic; cell border width; cell boarder patter, such as a dashed pattern; and combinations thereof. In some embodiments, the active cell can correspond to the current playback position, for example such that seek bar 305 and the highlighted cell correlate to the same position in time, and move with the playback of the music. FIGS. 5A and 5B represent an instant in time at which the playback position is represented by cell $311_{1,5}$ (i.e. the system is currently playing the sound associated with the beat of music correlating to cell $311_{1,5}$). In a following instant, system 10 will highlight cell $311_{1,6}$ and position indicator 306 will continue to seek to the right (as indicated by arrows A and B). In some embodiments, system 10 can be configured to highlight an entire row 312 at a time, such that the highlighted row 312 remains highlighted while each beat represented by the row is played by the system.

In some embodiments, system 10 comprises a beat metronome, such as a metronome that produces an aural and/or a visual cue during playback. The beat metronome can be configured to produce a cue for each cell 311 during playback of output file 50.

Figure 6:
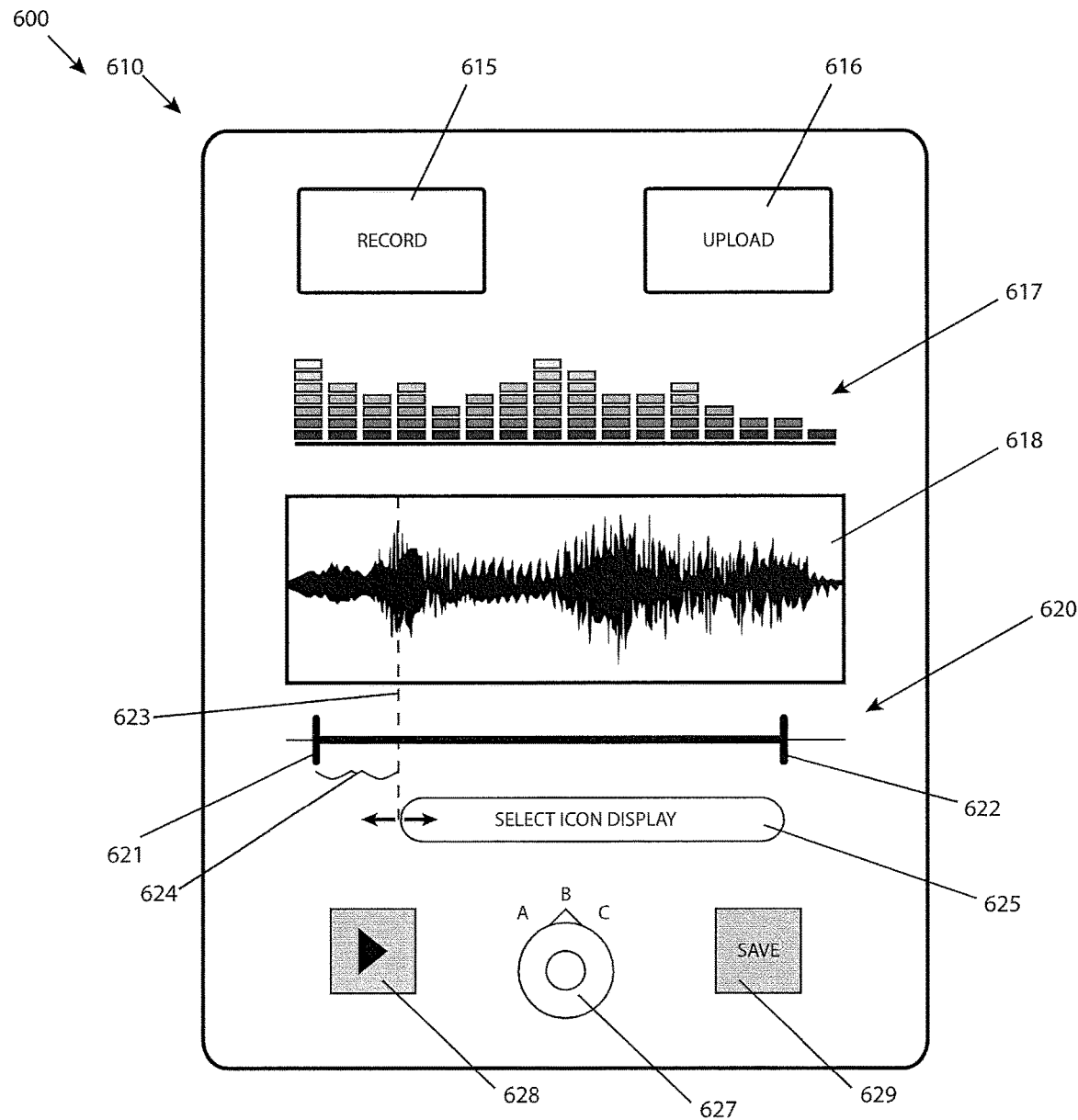
FIG. 6 illustrates a video display implementing a subroutine configured to allow a user to create and/or modify a source data file, consistent with the present inventive concepts.

Referring now to FIG. 6, a video display implementing a subroutine configured to allow a user to create and/or modify a source data file is illustrated, consistent with the present inventive concepts. Subroutine 600 can comprise a graphical user interface, display 610. Display 610 comprises multiple display areas and controls to allow a user to generate new and/or modify existing source data files 350 of system 10. Subroutine 600 can comprise record button 615, and a record function, configured to allow a user to record an audio, video, or other input to be captured and/or manipulated by subroutine 600. Subroutine 600 can further comprise upload button 616, and an upload function, configured to allow a user to upload and audio, video, or other file to be captured and/or manipulated by subroutine 600, such as via a data transfer port such as a USB port.

Subroutine 600 can include a spectrum analyzer or other graphical information display, graph 617, configured to indicate proper function of one or more input devices, such as microphone 201 of system 10, as described hereabove in reference to FIG. 1. Subroutine 600 can further include a visual time display, display area 618, configured to provide a visual representation of the length of the recorded, uploaded or otherwise loaded (hereinafter loaded, e.g. when an existing source data file 350 has been loaded into subroutine 600 for editing by a user) file. In some embodiments, the loaded file can comprise an audio file, and display area 618 can comprise a waveform display of at least a portion of the loaded file. In an alternative embodiment, the loaded file can comprise a video file, and display area 618 can comprise two or more frames of video, representing at least two different time indexes of the video file.

Subroutine 600 can include a trim control 620, including start and end selectors 621 and 622 respectively. Trim control 620 can align with display area 618, such that selectors 621 and 622 can be aligned automatically or by the user to specific portions of the waveform or other time indicator displayed in display area 618. In some embodiments, display area 618 comprises two video frames (e.g. when the loaded file comprises a video file), a first video frame corresponding to the time index of the location of selector 621 and a second video frame corresponding to the time index of the location of selector 622. The first and/or second video frames can be configured to update, such as update in near real time, as a user adjusts the position of start and/or end selector 621 and/or 622 respectively.

In some embodiments, the loaded file comprises an audio file, and display area 618 comprises a waveform representing the audio file. Subroutine 600 can comprise an algorithm to automatically detect the beginning and/or the end of the loaded audio file, and automatically position start and end selectors 621 and 622 respectively. Additionally or alternatively, a user can adjust the position of selectors 621 and 622. Subroutine 600 further includes select icon display 625, representing the time correlation between the loaded waveform and its representative select icon (e.g. select icon 321 to be used with system 10 described hereabove). In some embodiments, select icon display 625 matches the selected length determined by selectors 621 and 622, and represents the entire length of the loaded audio file. Alternatively, select icon display can be adjusted to align with at least a portion of the selected length determined by selectors 621 and 622, and the loaded source data file can comprise an offset and/or a trail off, offset 624 as shown. Subroutine 600 can comprise an algorithm to automatically align the start of select icon display with the first down beat, or other musically determinable portion of the loaded file. Additionally or alternatively, a user can adjust the size and/or position of select icon display 625 relative to display area 618.

Subroutine 600 can comprise a video recorder function, configured to allow a user to play an output file 50, such as a preview or final output file, while recording video. Subroutine 600 can be configured to synchronize the captured video with output file 50, or otherwise with a corresponding grid layout, such as a grid layout created using system 10 as described hereabove. Subroutine 600, and or another subroutine of system 10 can be configured to allow a user to replay the recorded video during and/or after a change has been made to the corresponding grid layout, and view the video while hearing the modified output file 50. System 10 can be further configured to display a replay of the recorded video, while providing a visual representation of the current position of the track on the grid image, and described hereabove in reference to FIG. 5.

In some embodiments, subroutine 600 comprises a text to speech function. The text to speech function can be configured to analyze a textual input file to create synthetic and/or computer speech. In some embodiments, subroutine 600, and or another subroutine of system 10, can upload an electronic file, such as a file selected from the group consisting of: source data file; electronic spreadsheet; graphics file; scanned paper document; and combinations thereof. In some embodiments, system 10 comprises an algorithm for analyzing the uploaded source data file, and determining one or more actions based on the analysis. In some embodiments, system 10 can analyze a spreadsheet, scanned image, and/or other file corresponding to a grid layout and automatically or otherwise populate at least a portion of grid layout 310.

In some embodiments, subroutine 600 can comprise a sound modification module configured to modify the sound of one or more loaded files. In some embodiments, multiple source data files can be loaded into subroutine 600, and/or subroutine 600 can be configured to make modifications to some or all source data files 350 of a particular type, for example all music source data files, or all sound effect source data files. The modified source data files 350 can be selected from the group consisting of: music; voice over; sound effect; text; and combinations thereof. The sound modification module can comprise one or more preset modifications or effects to be applied to the source data file 350, such as is described hereabove in reference to FIG. 2. Subroutine 600 can comprise a graphical knob or other user manipulatable selector, selector 627, configured to allow the user to choose a predefined sound modification. In some embodiments, subroutine 600 comprises one or more controls for manipulating the playback speed of the loaded file, for example the speed of recorded and/or uploaded audio or visual files.

Subroutine 600 can further include a play button 628 and/or a save button 629. Play button 628 can be configured to play a preview of the loaded file. The preview can include an overlay as described hereabove. Save button 629 can be configured to save the modifications made to one or more existing source data files 350. Additionally or alternatively, save button 629 can be configured to generate a new source data file 350, such as when the loaded file comprises a user uploaded file. The new source data file 350 can be saved in library 120 of system 10, and/or it can be stored in one or more other libraries (i.e. memory locations), such as a library local to the user (e.g. on a user's computer).

While the present inventive concepts have been particularly shown and described above with reference to example embodiments thereof, it will be understood by those of ordinary skill in the art, that various changes in form and detail can be made without departing from the spirit and scope of the present inventive concepts described and defined by the following claims.

What is claimed is:

1. A system for a user to create an output file, comprising:
a processing unit;
a user input module operably connected to the processing unit; and
a video monitor operably connected to the processing unit, wherein the processing unit provides on the video monitor:
 a grid image comprising multiple cells, each cell representing a duration of time; and
 a selection area comprising multiple select icons, each select icon representing a source data file;
wherein the processing unit is configured such that the user can create a grid layout representing a correlation between individual selected source data files and one or more of the multiple cells;
wherein the processing unit comprises a preview function configured to provide a preview output based on the correlation;
wherein the processing unit produces the output file based on the correlation;
wherein the output file correlates to a musical score comprising multiple beats of music; and
wherein each cell of the grid image is associated with one of the beats of music.

2. The system according to claim 1, wherein the system is configured to prevent the user from saving the preview output.

3. The system according to claim 1, wherein the processing unit is further configured to associate a source data file with a cell when a user drags and drops the associated icon in the cell.

4. The system according to claim 3, wherein the icon is configured to be dragged from the selection area to the cell.

5. The system according to claim 1, wherein the preview function is configured to master a cumulative set of selected source data files.

6. The system according to claim 5, wherein the mastering includes a process selected from the group consisting of: summing; combining; manipulating; processing; mastering; equalizing; compressing; filtering; delaying; adding reverb; adding harmonic excitement; and combinations thereof.

7. The system according to claim 5, wherein the processing unit is configured to allow a user to adjust the mastering process.

8. The system according to claim 5, wherein the processing unit is configured to use a predefined mastering process.

9. The system according to claim 5, wherein the processing unit comprises at least one user selectable sound processing effect used in the mastering process.

10. The system according to claim 1, wherein the processing unit further comprises a cost calculation module configured to provide cost information related to the selected source data files and/or the output.

11. The system according to claim 10, wherein the cost calculation module is configured to dynamically adjust cost information as the content of the grid layout changes.

12. The system according to claim 10, wherein the cost calculation module is configured to adjust costs based on one or more of: length associated with the output; source data files included in the output; and cost reduction associated with a user.

13. The system according to claim 10, wherein the cost calculation module is configured to present cost information on the video monitor at least prior to purchase of the output by a user.

14. The system according to claim 1, wherein the processing unit further comprises a proprietary overlay placement module.

15. The system according to claim 14, wherein the overlay placement module is configured to place an audio overlay.

16. The system according to claim 14 wherein the overlay placement module is configured to place an image overlay.

17. The system according to claim 14, wherein the overlay placement module is configured to include an overlay on pre-purchased audio files played and/or downloaded.

18. The system according to claim 14, wherein the overlay placement module is configured to remove an overlay upon purchase of the output.

19. The system according to claim 1, wherein the processing unit further comprises an auto save function.

20. The system according to claim 1, wherein the processing unit further comprises an undo and/or redo function.

21. The system according to claim 1, wherein the time duration of each cell comprises a time between 0.25 and 1.0 seconds.

22. The system according to claim 1, wherein the time duration of each cell is adjustable based on an input from the user, wherein the user input comprises the number of the multiple beats per minute of the musical score.

23. The system according to claim 1, wherein at least one source data file comprises an audio file.

24. The system according to claim 23, wherein at least one of the multiple select icons represents the at least one source data file and comprises a width correlating to the length of the audio file.

25. The system according to claim 1, wherein multiple cells comprise similar durations of time.

26. The system according to claim 1, wherein at least one source data file comprises position information correlating to where the select icon representing the source data file will appear within a cell of the grid image.

27. The system according to claim 26, wherein the position information comprises information related to where the associated select icon will appear in relation to select icons of other source data files in the same cell.

28. The system according to claim 1, wherein a location of an overlay is dynamically computed.

* * * * *